Figure 1:
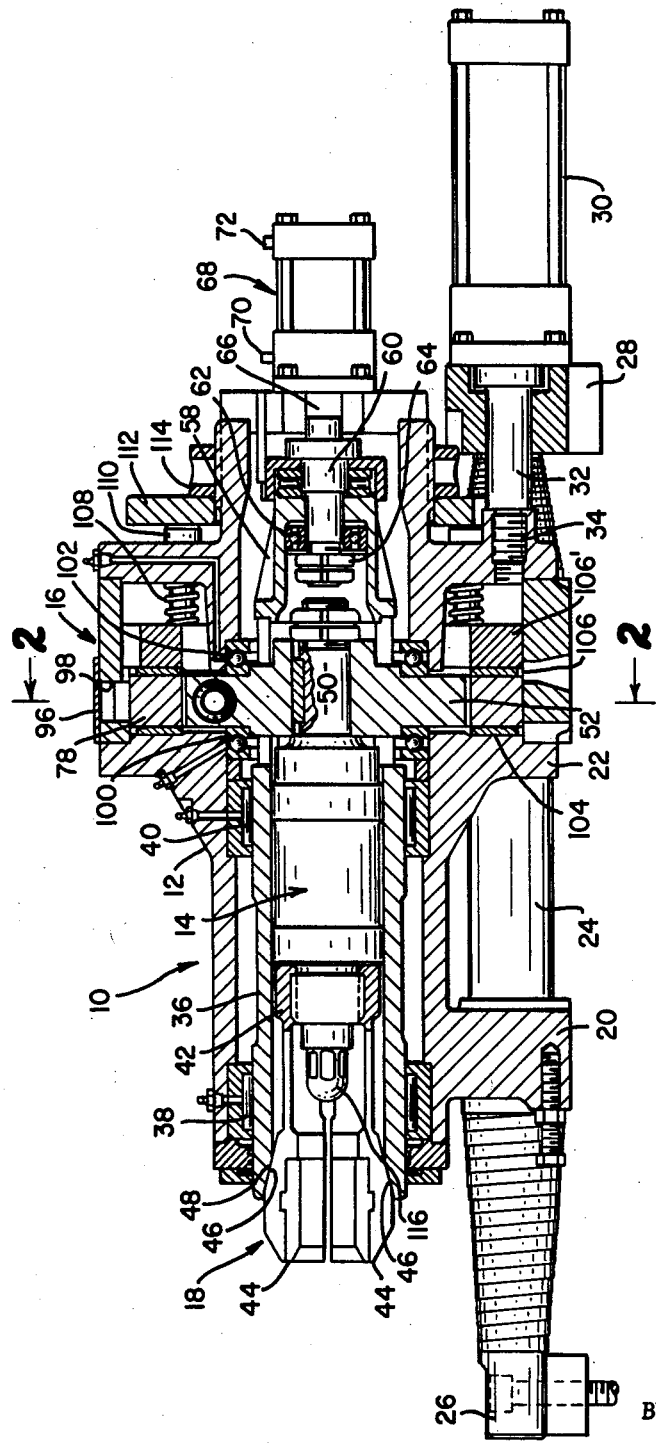

INVENTOR.
LEWIS H. RUPLE
BY Malcolm W. Fraser
ATTORNEY

Aug. 4, 1964   L. H. RUPLE   3,143,189
SPRING TENSIONED COLLET CHUCK FOR SWAGING MACHINES
Filed Oct. 4, 1962   2 Sheets-Sheet 2

INVENTOR.
LEWIS H. RUPLE
BY Malcolm W. Fraser
ATTORNEY

United States Patent Office 3,143,189
Patented Aug. 4, 1964

3,143,189
SPRING TENSIONED COLLET CHUCK FOR SWAGING MACHINES
Lewis H. Ruple, Perrysburg, Ohio, assignor to Abbey Etna Machine Company, Perrysburg, Ohio, a corporation of Ohio
Filed Oct. 4, 1962, Ser. No. 228,410
6 Claims. (Cl. 185—40)

This invention relates to improvements in work holding tools and, in particular, work holding tools for swaging machines that will convert intermittent rotary motion to intermittent rotary and reverse rotary motion.

Swaging machines are employed for reducing the diameter of a section of a tube, rod or the like by recurrently striking the tube with swaging hammers having a rotary component of force. During the swaging operation, the tube or rod may be fed longitudinally into the swaging tool to achieve the desired reduction in diameter over a predetermined portion of the length of the tube or rod. In rotary swaging machines, unless the tube or rod is turned or rotated to present different surfaces of the element being swaged to the action of the swaging tools, fins develop on the element, and therefore, in order to produce a uniform and even swaging operation on all sides of the tube or rod, it is necessary to impart a relative rotary movement between the swaging mechanism and the tube or rod being swaged.

It is a particular object of the present invention to provide a tube or rod holding device for cooperation with the swaging jaws of swaging machines whereby as the swaging jaws intermittently impart a rotary motion to the tube or rod being swaged, the tube or rod is permitted to rotate in the direction of the rotary component of force imparted to the tube or rod and as the swaging jaws move out of engagement with the element being swaged, the device imparts a reverse rotary motion to the element so that the next blow by the swaging jaws will be against a different portion of the element.

It is a further object of the present invention to provide such a device wherein the speed of rotation and the arc of the reverse rotary oscillation of the work holding device are adjustable throughout a substantial range.

A further object of the present invention is to provide a work holding tool for swaging machines having improved self-opening collet-type chuck means.

Another object of the invention is to provide such a device that is relatively simple as to its parts and sturdy and rugged in construction.

These and other objects and advantages are provided in a mechanism for converting intermittent rotary motion to intermittent rotary and reverse rotary motion comprising a spindle, a work holding chuck secured at one end of the spindle, a spider secured to rotate with said spindle, an annular plate concentrically mounted for rotation in spaced relation to said spindle, means limiting independent rotary motion between said spider and said annular plate, said motion limiting means including a plurality of resilient torque transmitting members having opposite ends engaging the annular plate and the spindle, an adjustable friction brake means mounted to apply a rotary motion restraining force to the annular plate.

Figure 2:
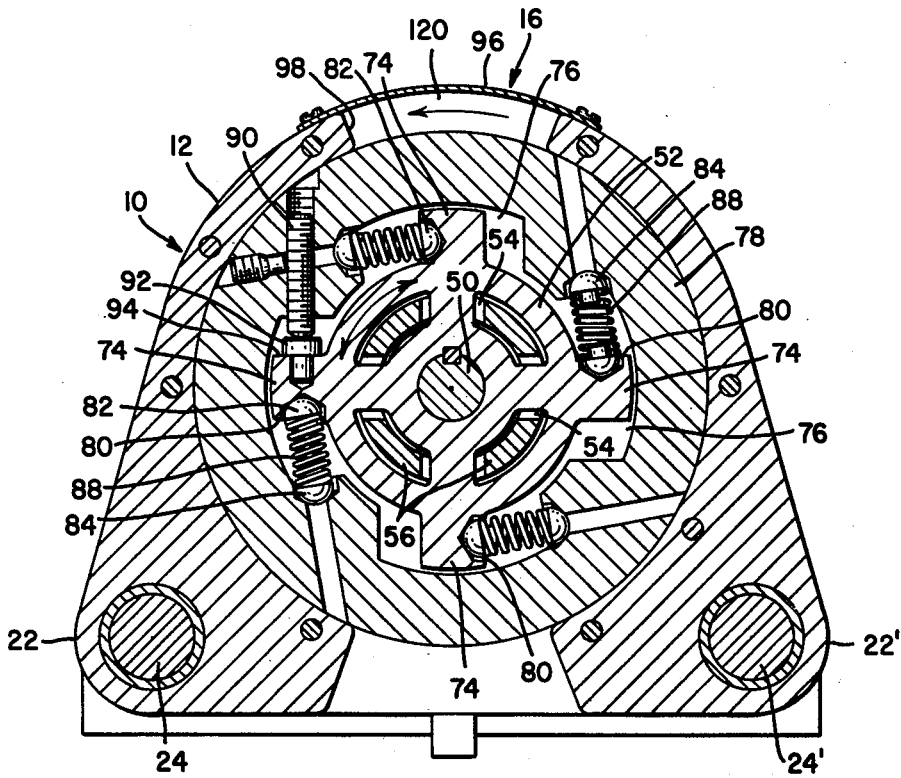

The invention will be more particularly described with reference to an illustrated embodiment of the present invention wherein:

FIG. 1 is a longitudinal sectional view of the improved work holding tool for swaging machines; and FIG. 2 is a section substantially on line 2—2 of FIG. 1.

Referring to the drawings, 10 generally designates the improved work holding device for a swaging machine and includes a casing 12 which rotatably mounts the spindle 14 having associated therewith the means for converting intermittent rotary motion to intermittent rotary and reverse rotary motion generally designated 16 and the self-opening chuck assembly generally designated 18.

The lower section of the frame 10 includes a pair of spaced forward bosses 20 and a pair of spaced rearward bosses 22 and 22'. Each of the pair of spaced bosses is bored and bushed to slidably receive one of a pair of parallel cylindrical slide rails 24 and 24'.

The forward and rearward ends of the cylindrical slide rails 24 and 24' are secured in forward and rearward crossbars 26 and 28, respectively, which crossbars are mounted to the bed of the swaging machine.

The rear crossbar 28 centrally supports a double acting hydraulic fluid actuated piston and cylinder unit designated 30. The extended end of the piston rod 32 of the piston and cylinder unit 30 is threadedly received as at 34 in a portion of the housing 12 whereby the housing 12 may be urged along the pair of cylindrical slide rails 24 and 24' between the limits of the forward and rearward crossbars 26 and 28 by selectively directing pressure fluid to one end or the other of the piston and cylinder unit 30.

The longitudinal adjustment of the housing or casing 12 permits withdrawal of the chuck away from the swaging tool to achieve clearance for loading and unloading the work piece and limited adjustment between the tube or rod being swaged and the swaging tool.

The spindle 14 is received in the cylindrical opening in a collet clamp 36. The cylindrical barrel portion of the collet clamp is mounted for rotation in a pair of spaced roller bearing assemblies 38 and 40, and, as will be more fully described hereinafter, the collet clamp 36 rotates with the spindle 14. The forward end of the spindle receives the rearward end 42 of the self-opening collet chuck 18. The collet chuck 18 consists of a plurality of jaw members 44 provided with cammed or sloping surfaces 46 which cooperate with conical surface 48 at the forward end of the collet clamp 36. Intermediate the collet jaws 44 and the rearward end 42 of the collet which engages the forward end of the spindle 14, the members forming the collet jaws 44 are relatively thin and provide the spring biasing for normally urging the jaws of the collet into the open position.

The rearward end 50 of the spindle 14 is keyed to a spider 52, the shape of which is more clearly shown in FIG. 2 of the drawings. The spider 52 is provided with a plurality, four being shown in the drawings, of arcuate slots 54 which extend from face-to-face thereof. Each of the slots receives a leg 56 milled from the annular collet clamp 36. The leg members 56 are sized in relation to the size of the arcuate slots 54 to be freely slidable therein.

The extended rearward ends of each of the leg members 56 are secured to an inner bearing cap 58 by cap screws not shown in the drawings. The inner bearing cap 58 is secured, for longitudinal movement, to a cylinder rod adapter 60 by means of bearing members 62 and lock nut assembly 64.

The cylinder rod adapter 60 is secured to the extended end 66 of the piston rod of the piston and cylinder unit 68. The piston and cylinder unit 68 is provided with pressure fluid outlet and inlet means 70 and 72 at the forward and rearward ends thereof, whereby when pressure fluid is directed to the rearward end of the piston and cylinder unit, the piston rod, the piston rod adapter 60, and the inner bearing cap 58 urge the collet clamp 36 forwardly. Forward motion of the collet clamp 36 causes the conical surface 48 thereof to urge the jaws 44 of the collet 18 toward each other to provide a clamping force on a tube or rod positioned between the jaws. Directing pressure fluid to the opposite ends of the piston and cylinder unit 68 urges the collet clamp 36 toward the rear end of the work holding device, permitting the resiliency of the collet arms to open the collet jaws to free the element being held therebetween.

Referring particularly to FIG. 2, the spider 52 is provided with four legs 74 which are equally spaced from each other. Each of the legs 74 cooperates with a slot or groove 76 formed in the inner cylindrical surface of a generally annular brake disc or plate member 78. The plate member 78, as illustrated in the drawings, is concentrically mounted in spaced relationship to the spider. The size of each of the legs 74 of the spider in relation to the arcuate width of each of the grooves 76 is such that the spider may rotate approximately 12 degrees relative to the annular brake disc 78. One edge 80 of each of the spider legs 74 is bored to seat a button 82. The opposite face of each of the grooves 76 is bored to seat a button 84. A resilient member, illustrated as helical spring means 88, receives the opposite necked end of each of the cooperating buttons 82 and 84. The four springs comprise the torque transmitting and motion imparting means between the spider 52 and the brake disc 78.

The assembly may also include a motion limiting and adjusting means. In FIG. 2, the motion limiting and adjusting means are illustrated as set screw 90 which is threadedly received in the brake disc 78 and a set screw bearing member 92 received in face 94 of one of the legs 74 of the spider 52. Adjustment of the motion limiting set screw 92 may be had by removing the cover plate 96 which normally covers the access opening 98 in the upper portion of the housing 12.

The assembly also includes a pair of thrust bearings 100 and 102 for the spider assembly and a pair of annular brake bands 104 and 106 which frictionally engage opposite surfaces of the brake disc 78. Braking torque is applied to the brake disc by a pressure plate 106' resiliently urged into the brake "on" position by a plurality of cooperating springs and pins 108 and 110, respectively. The rearward ends of pins 110 bear against a follower plate 112 which is adjustably urged toward the forward end of the assembly by a nut 114 threadedly engaging the rearward end of the housing 12.

*Operation*

With a pipe to be swaged held in collet chuck 44, with the most rearward end in abutment with the positive stop 116 carried at the end of spindle 14, rotational torque transmitted by the swaging jaws of a swaging machine is transmitted through the pipe, the collet, the collet clamp, the spindle 14 and the inner bearing cap 58 to the spider 52, imparting rotary motion to the spider which compresses the torque transmitting spring 88. When as a result of counterclockwise rotation of the rotating spider 52, the bearing 94 is moved away from the set screw 92 the rotary motion imparted by the swaging jaws causes the brake disc 78 to rotate with the spider in the direction of the directional arrow 120, FIG. 2 of the drawings, against the frictional force created by the brake discs 104 and 106. When the swaging jaws move away from the pipe being swaged, the energy stored in the plural springs 88 causes the spider 52 to rotate in the opposite direction from the rotation imparted to the spider and the brake disc by the swaging operation. The above-described rotation and reverse rotation intermittently take place during the swaging operation.

In order to shorten or lengthen the arc of the oscillatory motion, the set screw 90 is adjusted relative to the set screw bearing member 94. The speed of rotation of the spider and the brake disc is changed by adjusting the brake adjusting nut 114. Through the cooperative adjustment of the set screw 92 and the adjustment of the brake discs, the length of the arc of reverse rotation and the speed of forward rotation can be varied over wide limits to suit substantially all conditions of swaging operation.

From the foregoing description of an embodiment of the present invention, it will be seen that the mechanism fully accomplishes the aims and objects hereinbefore set forth. It will be apparent to those skilled in the art that various changes and modifications may be made in the structures disclosed herein without departing from the scope of the invention defined in the following claims.

I claim:

1. A work holding device including a spindle, a work holding chuck secured to one end of the spindle, a spider secured to rotate with said spindle and said chuck, an annular plate mounted for rotation in spaced relation to said spindle, means limiting independent rotary motion between said spider and said annular plate, said motion limiting means including a plurality of resilient torque transmitting members having opposite ends engaging the annular plate and the spider, and friction brake means mounted to apply a rotary motion restraining force to the annular plate.

2. A work holding device comprising a spindle, a work holding chuck secured to one end of the spindle, a spider secured to rotate with said spindle, an annular plate concentrically mounted for rotation in spaced relation to said spider, means limiting independent rotary motion between said spider and said annular plate, said motion limiting means including a plurality of helical springs having opposite ends engaging the annular plate and the spider, and adjustable friction brake means mounted to apply a rotary motion restraining force to said annular plate.

3. A work holding device comprising a spindle, a work holding chuck secured to one end of the spindle, a spider secured to rotate with said spindle, said spider having a plurality of radially extending leg members, an annular plate mounted for rotation in spaced relation to said spider, said annular plate having a plurality of grooves therein cooperating with each of the spider legs, means limiting independent rotary motion between said spider and said annular plate, said motion limiting means including a helical spring acting between an edge of each of the spider legs and a face of the cooperating groove in the annular plate, and adjustable friction brake means mounted to apply a rotary motion restraining force to the annular plate.

4. A work holding device comprising a spindle, a work holding chuck secured to one end of the spindle, a spider secured to rotate with said spindle, said spider having a plurality of radially extending leg members, an annular plate mounted for rotation in spaced relation to said spider, said annular plate having a plurality of grooves therein cooperating with each of the spider legs, adjustable means limiting independent rotary motion between said spider and said annular plate, said motion limiting means including a helical spring acting between an edge of each of the spider legs and a face of the cooperating groove in the annular plate and set screw means received in the annular plate and adjustably urged toward and away from one of the legs of said spider, and adjustable friction brake means mounted to apply a rotary motion restraining force to the annular plate.

5. Mechanism for converting intermittent rotary motion to intermittent rotary and reverse rotary motion comprising a spindle, a spider secured to rotate with said spindle, an annular plate mounted for rotation in spaced relation to said spider, means limiting independent rotary motion between said spider and said annular plate, said rotary motion limiting means including a plurality of resilient torque transmitting members having opposite ends engaging the annular plate and the spider, and friction brake means mounted to apply a rotary motion restraining force to said annular plate.

6. Mechanism for converting intermittent rotary motion to intermittent rotary and reverse rotary motion comprising a spindle, a spider secured to rotate with said spindle, an annular plate concentrically mounted for rotation in spaced relation to said spider, means limiting independent rotary motion between said spider and said annular plate, said motion limiting means including a plurality of helical springs having opposite ends engaging the annular plate and the spider, and adjustable friction brake means mounted to apply a rotary motion restraining force to said annular plate.

References Cited in the file of this patent

UNITED STATES PATENTS

| | | |
|---|---|---|
| 1,324,734 | Dietrich | Dec. 9, 1919 |
| 2,254,536 | Loeffler | Sept. 2, 1941 |